United States Patent
Yeon et al.

(10) Patent No.: US 6,847,606 B2
(45) Date of Patent: Jan. 25, 2005

(54) AIR-BEARING SLIDER FOR OPTICAL DISK DRIVE

(75) Inventors: Cheol-sung Yeon, Suwon (KR); Dong-seob Jang, Seoul (KR); Gyu-chan Jun, Seoul (KR); Young-min Cheong, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 09/835,294

(22) Filed: Apr. 17, 2001

(65) Prior Publication Data

US 2002/0018441 A1 Feb. 14, 2002

(30) Foreign Application Priority Data

Jul. 18, 2000 (KR) ......................................... 2000-40982

(51) Int. Cl.[7] ................................................. G11B 7/12
(52) U.S. Cl. ...................................................... 369/300
(58) Field of Search .............................. 369/300, 13.13

(56) References Cited

U.S. PATENT DOCUMENTS

| | | | | |
|---|---|---|---|---|
| 5,124,961 A | * | 6/1992 | Yamaguchi et al. | ........ 369/300 |
| 5,970,038 A | * | 10/1999 | Boutaghou et al. | ...... 369/13.13 |
| 6,075,673 A | * | 6/2000 | Wilde et al. | ................. 369/300 |
| 6,130,779 A | * | 10/2000 | Carlson et al. | ............. 359/566 |
| 6,178,157 B1 | * | 1/2001 | Berg et al. | ................... 369/300 |
| 6,181,673 B1 | * | 1/2001 | Wilde et al. | ................. 369/300 |
| 6,275,467 B1 | * | 8/2001 | Wang et al. | ................. 369/300 |
| 6,320,841 B1 | * | 11/2001 | Watanabe et al. | ........... 369/300 |
| 6,434,088 B1 | * | 8/2002 | Ishizaki et al. | .......... 369/13.33 |

\* cited by examiner

Primary Examiner—Brian E. Miller
(74) Attorney, Agent, or Firm—Staas & Halsey LLP

(57) ABSTRACT

An air-bearing slider for an optical disk drive for recording/reproducing information onto/from an optical disk while floating and moving at a predetermined height from the rotatably installed optical disk due to a dynamic air pressure is disclosed. The air-bearing slider includes a slider main body having an objective lens installation hole formed through the slider main body so that an objective lens can be installed, and an opening formed through the slider main body at one side portion of the objective lens installation hole, so that air flow flowing under the slider main body can flow out through the opening via the objective lens installation hole when the slider is floating as a result of dynamic air pressure.

14 Claims, 6 Drawing Sheets

AIR-BEARING SLIDER FOR OPTICAL DISK DRIVE

CROSS REFERENCE TO RELATED APPLICATIONS

This application claims the benefit of Korean Patent Application No. 00-40982 filed Jul. 18, 2000 in the Korean Industrial Property Office, the disclosure of which is incorporated herein by reference.

BACKGROUND OF THE INVENTION

1. Field of the Invention

The present invention relates to an air bearing slider for a swing-arm type optical disk drive, and more particularly, to an air bearing slider for an optical disk drive adapted so that an objective lens can be installed stably, and dust is prevented from accumulating in an objective lens installation hole.

2. Description of the Related Art

Referring to FIG. 1, a conventional optical disk drive comprises a swing arm 21 installed on a base 10 to be pivotable in a direction S, an actuator 23 providing a rotational driving force for the swing arm 21, a slider 25 installed at the end portion of the swing arm 21 so as to move along the track of an optical disk 1 while floating on the optical disk 1 due to a dynamic air pressure, and an optical head 30 installed at the slider 25 and provided with an objective lens 31 forming an optical spot on the optical disk 1 and coils changing a magnetic field, so as to reproduce information optically.

Referring to FIGS. 2 and 3, the optical head 30 of the conventional optical disk drive includes the objective lens 31 installed at the slider 25 converging an incident laser beam onto the optical disk 1, and coils 35 installed horizontally at a side of the slider 25 so as to be positioned between the objective lens 31 and the optical disk 1. Here, the coils 35 are composed of a pair of coils wound in directions opposite to each other, and information is recorded on the optical disk 1 with the aid of a horizontal magnetic field produced according to the flow direction of a current applied to the coils 35 in order to guide the positioning of the beam.

However, in the optical head configured as described above, when the objective lens 31 is bonded to the slider 25 in a state in which the objective lens 31 only partially lies on the upper surface of the slider 25, there is a high possibility that the objective lens 31 is attached to be skew as an adhesive solidifies, and therefore, is disposed to be out of alignment with the optical axis or at a slant with respect to the optical axis.

In addition, when an objective lens installation hole is formed at the slider, and the whole outer circumferential portion of the objective lens is bonded within the installation hole, the problems of the deviation from the optical axis and the slant disposition due to bonding can be prevented, but there is a problem in that since dust accumulates in the objective lens installation hole, the performance of the objective lens deteriorates.

SUMMARY OF THE INVENTION

Accordingly, it is an object of the present invention to provide an air bearing slider for an optical disk drive so that the deviation of an objective lens from the optical axis and the undesired slant of the objective lens can be minimized, and further so that dust can be prevented from accumulating in an objective lens installation hole.

Additional objects and advantages of the present invention will become more apparent and more readily appreciated from the following description of the preferred embodiments, taken in conjunction with the accompanying drawings of which:

The foregoing objects of the present invention are achieved by providing an air-bearing slider for an optical disk drive recording/reproducing information onto/from an optical disk while floating and moving at a predetermined height from the rotatably installed optical disk due to a dynamic air pressure including: a slider main body having an objective lens installation hole formed through the slider main body so that an objective lens can be installed, and an opening formed through the slider main body at one side portion of the objective lens installation hole, so that air flow flowing under the slider main body can flow out through the opening via the objective lens installation hole when the slider is caused to float by a dynamic air pressure.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DESCRIPTION OF THE PREFERRED EMBODIMENTS

Figure 1:
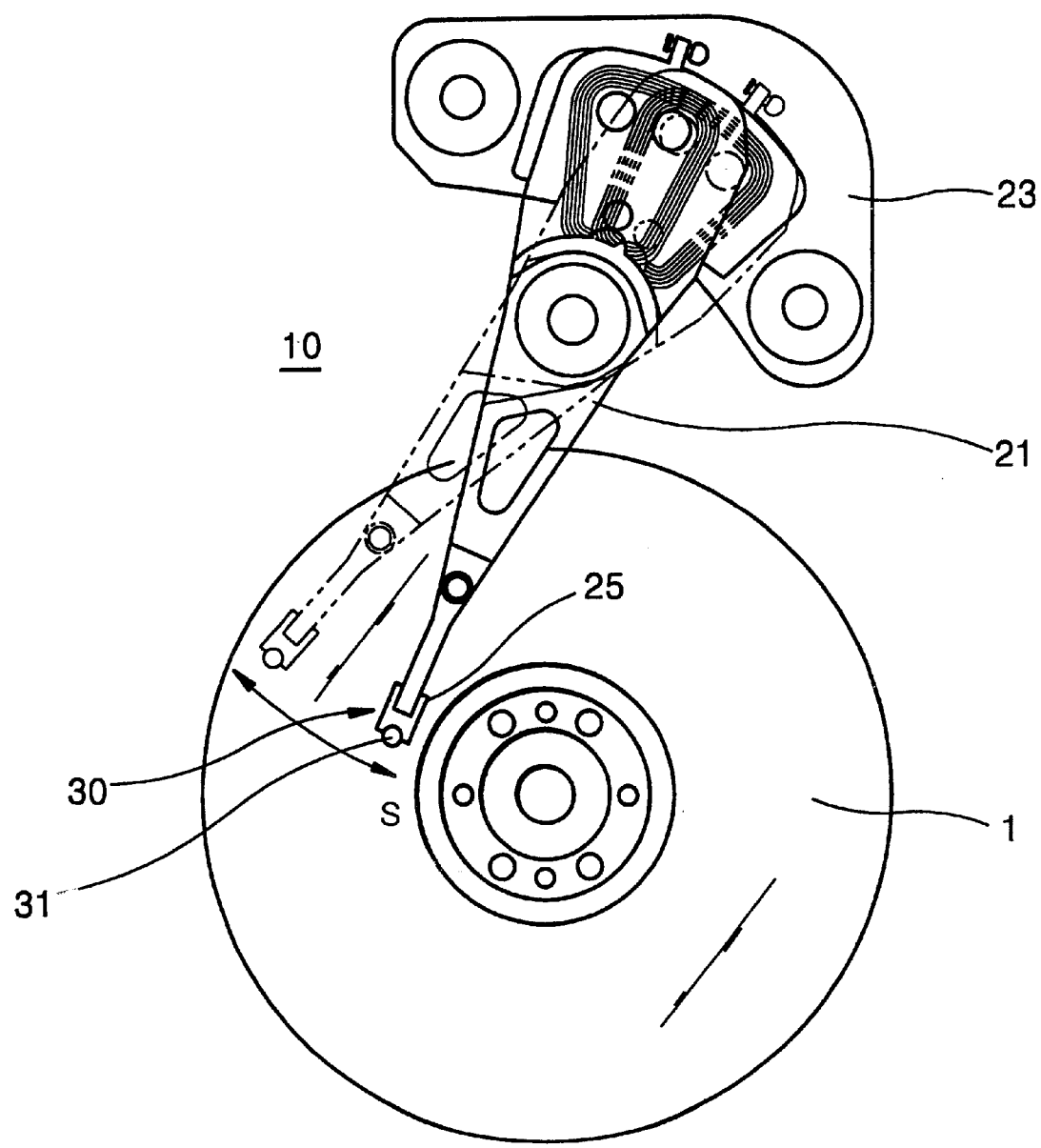
FIG. 1 is a schematic plan view illustrating a conventional swing-arm type optical disk drive.
Figure 2:
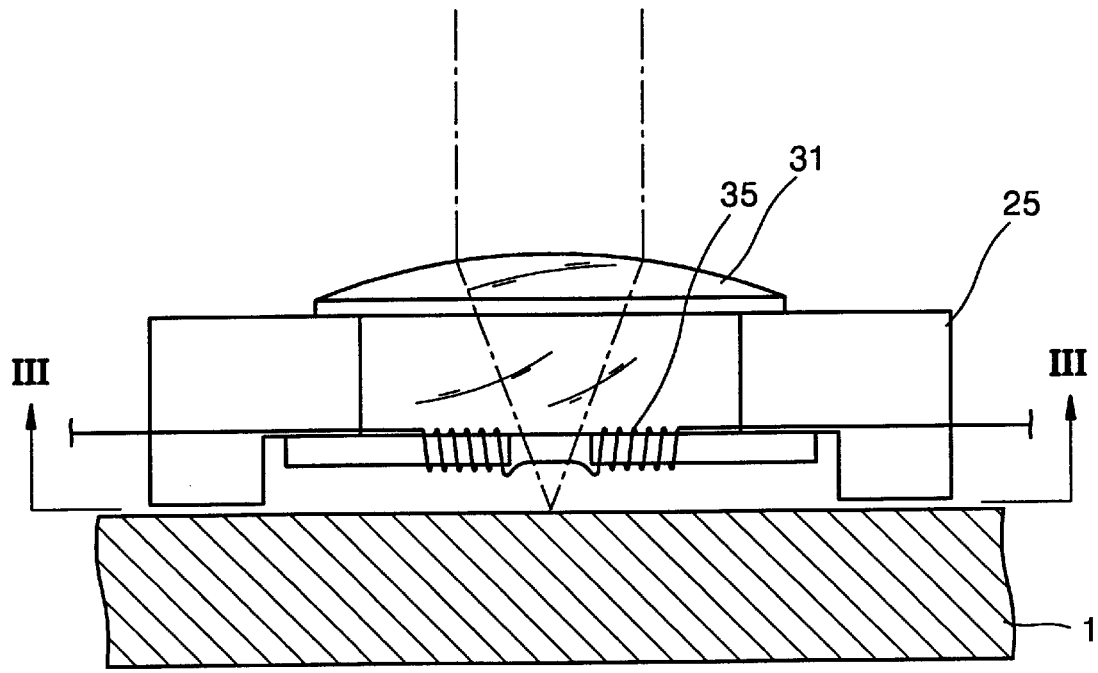
FIG. 2 is a schematic sectional view illustrating an optical head of the optical disk drive shown in FIG. 1.
Figure 3:
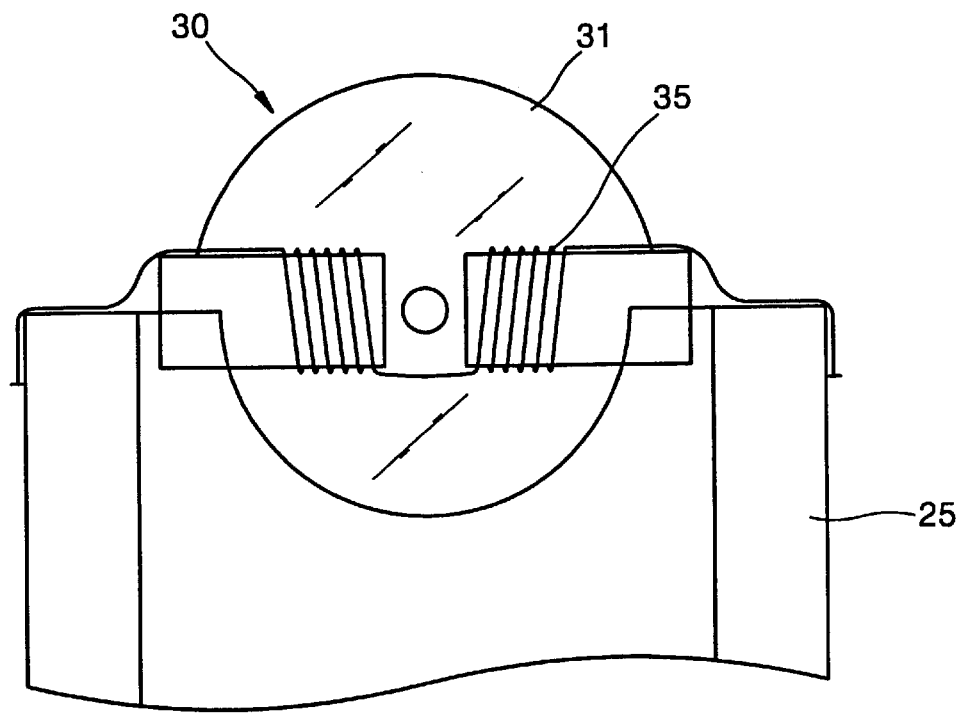
FIG. 3 is a schematic bottom view shown from the perspective in the direction indicated by line III—III of FIG. 2.

Reference will now be made in detail to the preferred embodiments of the present invention, examples of which are illustrated in the accompanying drawings, wherein like reference numerals refer to like elements throughout.

Figure 4:
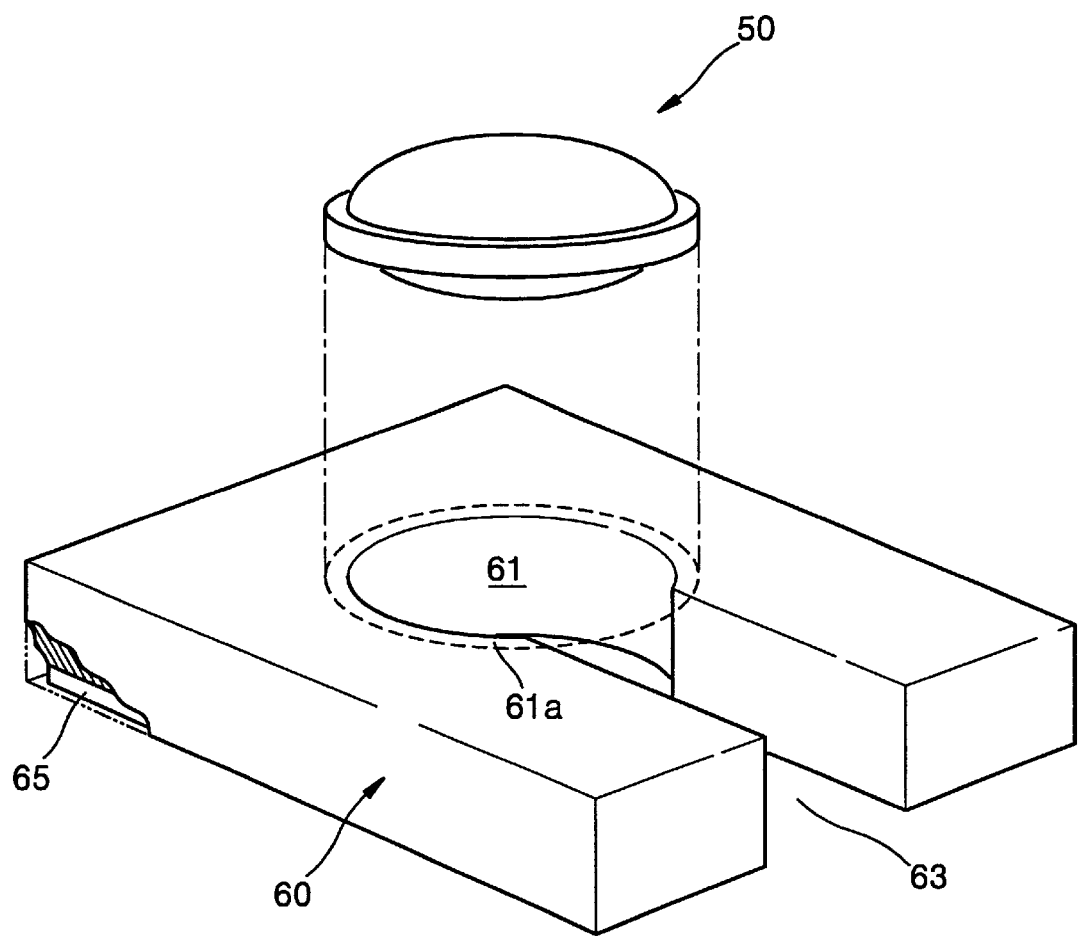
FIG. 4 is a schematic perspective view illustrating an air-bearing slider for an optical disk drive according to one embodiment of the present invention.
Figure 5:
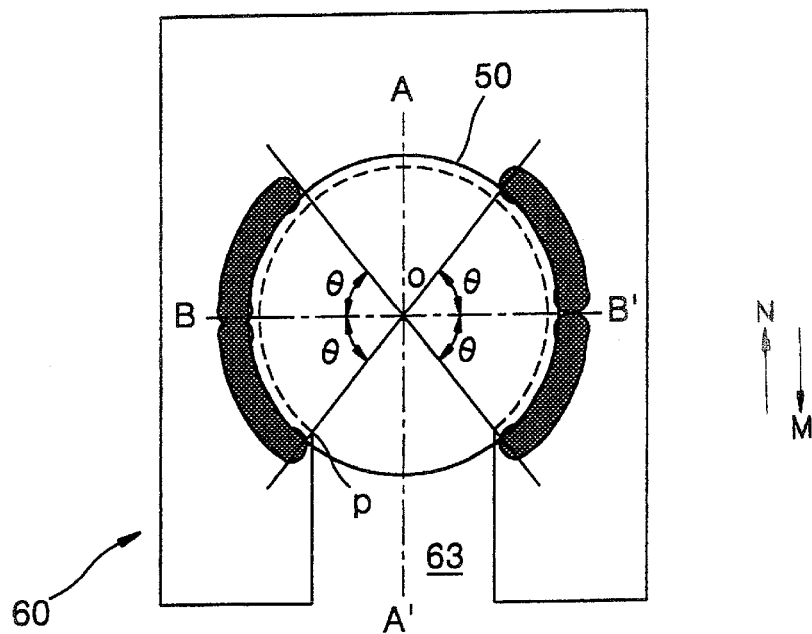
FIG. 5 is a plan view of the air-bearing slider shown in FIG. 4.
Figure 6:
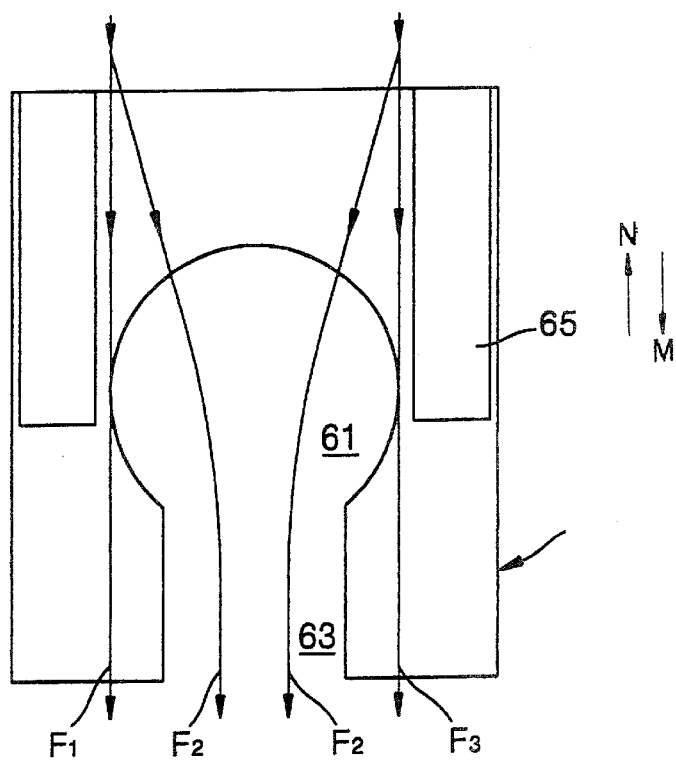
FIG. 6 is a bottom view of the air-bearing slider shown in FIG. 4.

Referring to FIGS. 4 through 6, an air-bearing slider for an optical disk drive according to an embodiment of the present invention includes a slider main body 60 on which an objective lens 50 is installed, and an air-bearing surface 65 formed at one surface of the slider main body 60, i.e., a surface facing an optical disk 1 (FIG. 1). The air-bearing slider is provided at a swing-arm type optical disk drive as shown in FIG. 1, and records information onto an optical disk or reproduces information from the optical disk while floating at a predetermined height from the rotatably installed optical disk due to a dynamic air pressure, and moves over the optical disk.

The slider main body 60 has an objective lens installation hole 61 which is formed through the upper and lower surfaces of the slider main body 60 in which the objective lens 50 may be installed thereon, and an opening 63 provided between one side portion of the objective lens installation hole 61 and one end of the slider main body 60. Here, the objective lens 50 is installed over the objective lens installation hole 61 by bonding. A bonding portion 61a to which the objective lens 50 is bonded is provided around the periphery of the objective lens installation hole 61 except at the opening 63, so that the objective lens 50 can be stably bonded over the objective lens installation hole 61.

The opening 63 is provided between the objective lens installation hole 61 and the rear end of the slider main body 60, as illustrated in FIG. 5, with the front end shown as A, and the rear end shown as A'. The front and rear portions of the slider main body 60 are designated with respect to the rotation direction of the optical disk M such that a line extending from the front portion to the rear portion is substantially parallel to the rotation direction of the optical disk. Further, segment A–A' is parallel to the relative movement direction N of the slider main body 60 with respect to the rotation direction of the optical disk M. Note that the rotational direction of the optical disk M is defined herein as a line perpendicular to the radial direction of the optical disk at the point at which the slider main body is positioned directly above the optical disk. Here, the opening 63 is formed to communicate with the objective lens installation hole 61 and to have a predetermined length.

In this case, since the pressure within the objective lens installation hole 61 is atmospheric pressure, the same as that of the outside of the slider main body 60, air flowing into the objective lens installation hole 61 can easily flow to the outside of the slider main body 60 via the opening 63. That is, reviewing the directions of air flow $F_1$, $F_2$, and $F_3$ indicated by arrows in FIG. 6, a portion of air flow $F_2$ is developed when the air-bearing surface 65 is floated by a dynamic air pressure flowing through the opening 63 via the objective lens installation hole 61. Therefore, dust is prevented from accumulating within the objective lens installation hole 61 and at the lower surface of the objective lens 50, and any accumulated dust can be removed.

Referring to FIG. 5, an angle θ is defined between a segment OP, passing through one end (P) of the opening 63 which meets the objective lens installation hole 61, and extending at its opposite end through the center point (O) of the objective lens installation hole 61, and a segment B–B', which is substantially perpendicular to the relative movement direction (N direction) of the slider main body 60 with respect to the rotation direction M of the optical disk and passes through the center point (O) of the objective lens installation hole 61. This angle θ is preferably satisfied by the following Formula (1):

$$0°<\theta<90°. \tag{1}$$

That is, when the angle θ<0° in FIG. 5, i.e., when the angle A'OP is an obtuse angle, a bonding portion as illustrated by the shaded region is less than a half circle, and only the upper portion of the objective lens 50 with respect to line B–B' in FIG. 5 is bonded. Therefore, when an adhesive is solidified at the bonded portion, which is unsymmetrical with respect to line B–B', there is a possibility in that the objective lens is installed in an undesirably sloped fashion. In contrast, when the angle θ is θ>0°, the bonded portion extends to a section below the line B–B', and supports the objective lens 50 such as to prevent undesirable sloping. Furthermore, when the angle θ is 0°<θ<90°, thus allowing an opening 63 to be formed, dust flowing in the objective lens installation hole 61 can be prevented from accumulating on the surface of the objective lens 50. Therefore, it is preferable that the angle θ satisfies the conditions of Formula (1).

Formula (1) expresses a theoretical case, and, in an actual case, it is preferable that the angle θ satisfies the following Formula (2) provided below so as to ensure a sufficient bonding area and enough passage to discharge dust:

$$10°<\theta<80°. \tag{2}$$

Figure 7:
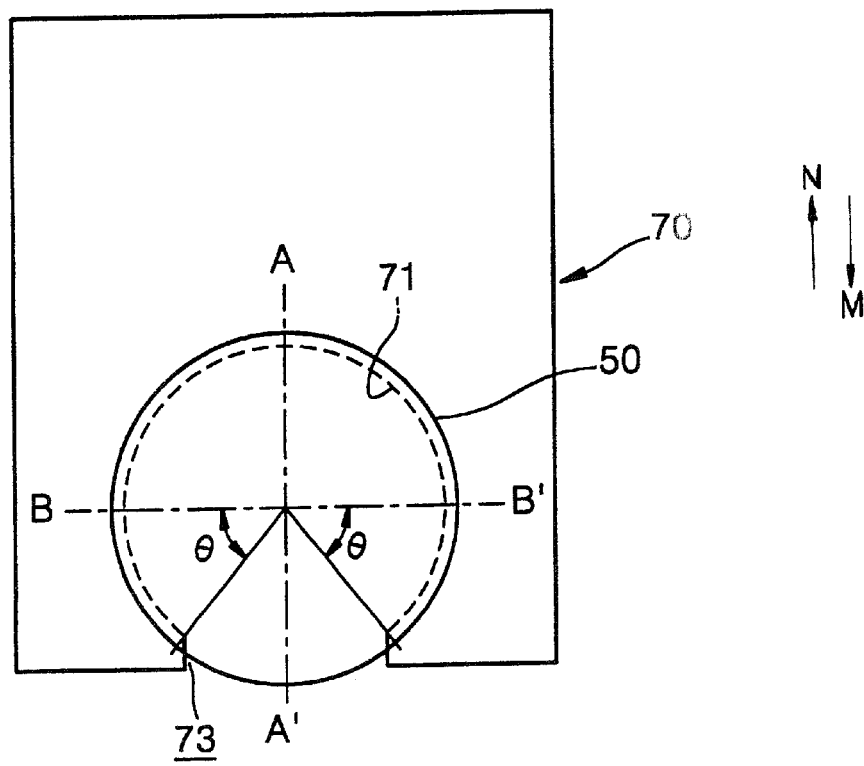
FIG. 7 is a schematic plan view illustrating an air-bearing slider for an optical disk drive according to another embodiment of the present invention.

Referring to FIG. 7, an air-bearing slider according to another embodiment of the present invention includes a slider main body 70 having an objective lens installation hole 71 and an opening 73 which has a structure similar to that described above, and is further characterized in that the objective lens installation hole 71 is positioned to be closer to the rear end side (A') in the relative movement direction N of the slider main body 70 with respect to the rotation direction M of the optical disk. In this case, since the length of the opening 73 is short, there is an advantage in that the slider main body 70 can be easily manufactured.

Figure 8:
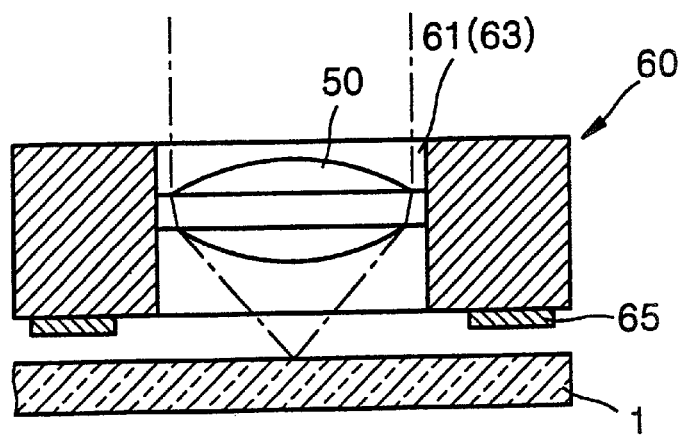
FIG. 8 is a schematic sectional view illustrating an example of installation of an objective lens at an air-bearing slider according to an embodiment of the present invention.
Figure 9A:
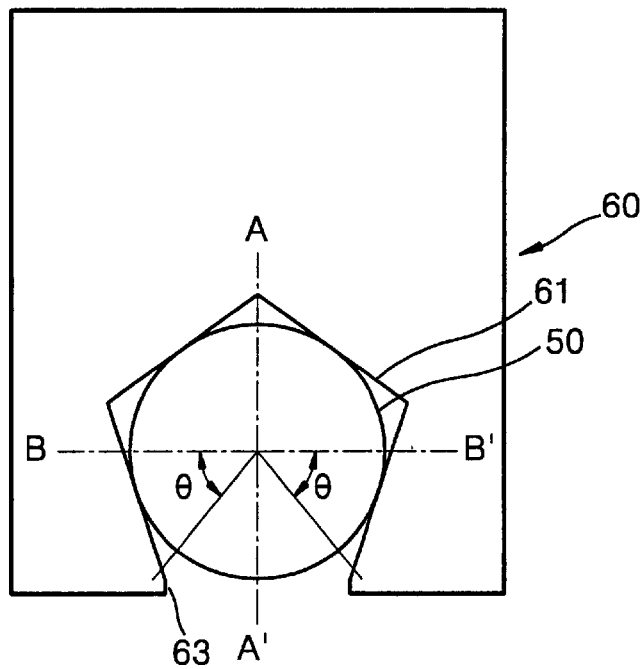
FIG. 9A illustrates an objective lens installation hole in an air-bearing slider according to another embodiment of the present invention.
Figure 9B:
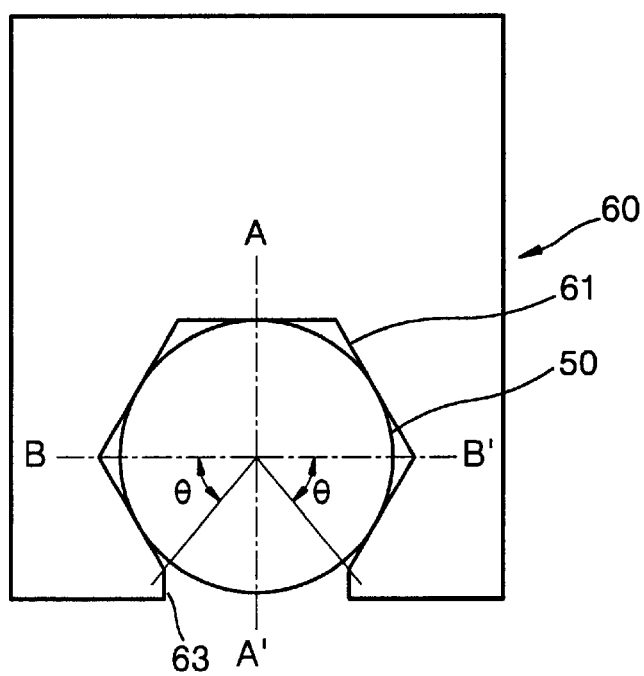
FIG. 9B illustrates an objective lens installation hole in an air-bearing slider according to another embodiment of the present invention.

In addition, in an air-bearing slider according to still another embodiment of the present invention, as shown in FIG. 8, an objective lens 50 may be inserted into and installed in an objective lens installation hole 61.

Further, when the objective lens installation hole 61 is provided by cutting the slider main body 60 in a horizontal direction, the sectional shape of the objective lens installation hole 61 may be in the shape of a pentagon, hexagon, or the like other than a circle as shown in FIGS. 5 and 6.

In the air-bearing slider for an optical disk drive according to the present invention configured as described above, since the objective lens installation hole is provided in the slider main body, and the bonding surface of the objective lens occupies more than a half the circumference of the objective lens installation hole, errors in the optical axis and horizontal position alignment of the objective lens can be minimized. In addition, since dust can be prevented from accumulating on an installed objective lens by providing an opening at the slider main body, there is an advantage in that the performance of the lens can be prevented from deteriorating due to contamination.

Although a few preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. An air-bearing slider for an optical disk drive for recording/reproducing information onto/from an optical disk while floating and moving at a predetermined height from the rotatably installed optical disk due to a dynamic air pressure, the air-bearing slider comprising:

an objective lens; and a slider main body having an objective lens installation hole formed through the slider main body to which the objective lens is installed, and an opening formed through the slider main body at one side portion of the objective lens installation hole, so that air flow flowing under the slider main body flows out through the opening via the objective lens installation hole when the slider floats by a dynamic air pressure, wherein the opening has a width that is less than a length across the objective lens installation hole.

2. The air-bearing slider for an optical disk drive as claimed in claim 1, wherein the opening is provided at a rear end portion of the objective lens installation hole to have a predetermined length extending in the relative movement direction of the slider main body with respect to the rotation direction of the optical disk so that the air flowing in the objective lens installation hole is discharged through the opening.

3. The air-bearing slider for an optical disk drive as claimed in claim 2, wherein the objective lens is installed on the objective lens installation hole by bonding.

4. The air-bearing slider for an optical disk drive as claimed in claim 2, wherein the objective lens is inserted into and installed in the objective lens installation hole.

5. The air-bearing slider for an optical disk drive as claimed in claim 1, wherein the objective lens is installed on the objective lens installation hole by bonding.

6. The air-bearing slider for an optical disk drive as claimed in claim 1, wherein the objective lens is inserted into and installed in the objective lens installation hole.

7. The air-bearing slider for an optical disk drive as claimed in claim 1, wherein the objective lens installation hole is in a shape of a pentagon.

8. The air-bearing slider for an optical disk drive as claimed in claim 1, wherein the objective lens installation hole is in a shape of a hexagon.

9. An air-bearing slider for an optical disk drive to record and/or reproduce information onto/from an optical disk while floating and moving at a predetermined height from the rotatably installed optical disk due to a dynamic air pressure, the air-bearing slider comprising:
   an objective lens; and
   a slider main body having an objective lens installation hole formed through the slider main body to which the objective lens is installed, and an opening formed through the slider main body at one side portion of the objective lens installation hole, so that air flow flowing under the slider main body flows out through the opening via the objective lens installation hole when the slider floats by a dynamic air pressure,
   wherein when an angle between a segment passing through one inner end of the opening which meets the objective lens installation hole and extending through a center point of the objective lens installation hole and a
   a segment which is substantially perpendicular to the rotation direction of the optical disk and passes through the center point of the objective lens installation hole is defined as angle θ, the angle θ satisfies the following formula, $$0°<θ<90°.$$

10. The air-bearing slider for an optical disk drive as claimed in claim 9, wherein a length of the opening is shorter than a width of the opening.

11. An air bearing slider for an optical disk drive comprising:
   a slider main body having an objective lens installation hole formed therein and an opening extending from a portion of the installation hole to one end of the slider main body, so that air flow flowing under the slider main body flows out through the opening when the slider floats by a dynamic air pressure wherein the opening has a width that is less than a length across the installation hole.

12. The air bearing slider according to claim 11, wherein a length of the opening extends substantially parallel to the rotational direction of the optical disk.

13. The air bearing slider according to claim 12, further comprising an objective lens bonded over the installation hole at peripheral edges thereof.

14. The air bearing slider according to claim 12, further comprising an objective lens bonded within the installation hole.

* * * * *

UNITED STATES PATENT AND TRADEMARK OFFICE
CERTIFICATE OF CORRECTION

PATENT NO.    : 6,847,606 B2
DATED         : January 25, 2005
INVENTOR(S)   : Cheol-sung Yeon It is certified that error appears in the above-identified patent and that said Letters Patent is hereby corrected as shown below:

Column 6,
Line 11, delete "a".

Signed and Sealed this

Twenty-eighth Day of June, 2005

JON W. DUDAS
*Director of the United States Patent and Trademark Office*